United States Patent
Weber et al.

(10) Patent No.: US 9,705,189 B2
(45) Date of Patent: Jul. 11, 2017

(54) RADAR SENSOR DEVICE HAVING AN ADJUSTING MIRROR

(71) Applicant: Robert Bosch GmbH, Stuttgart (DE)

(72) Inventors: Dieter Weber, Canton, MI (US); Michael Zoeller, Renningen (DE); Gerald Zeller, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 14/377,847

(22) PCT Filed: Dec. 17, 2012

(86) PCT No.: PCT/EP2012/075768
§ 371 (c)(1),
(2) Date: Aug. 8, 2014

(87) PCT Pub. No.: WO2013/117278
PCT Pub. Date: Aug. 15, 2013

(65) Prior Publication Data
US 2015/0035703 A1 Feb. 5, 2015

(30) Foreign Application Priority Data
Feb. 10, 2012 (DE) .................. 10 2012 201 986

(51) Int. Cl.
*G01S 7/40* (2006.01)
*H01Q 1/42* (2006.01)
(Continued)

(52) U.S. Cl.
CPC ................ *H01Q 1/42* (2013.01); *G01S 7/02* (2013.01); *G01S 7/4026* (2013.01);
(Continued)

(58) Field of Classification Search
CPC ............ G01S 7/4026; G01S 2007/027; G01S 2013/9321; G01S 2013/9371; G01S 2013/9375; H01Q 1/42
(Continued)

(56) References Cited

U.S. PATENT DOCUMENTS 5,512,901 A * 4/1996 Chen ..................... G01S 7/032
342/175
5,926,127 A * 7/1999 Schmidt ................ G01S 7/032
342/175
(Continued)

FOREIGN PATENT DOCUMENTS

DE 19642811 4/1998
DE 19852101 5/2000
(Continued)

OTHER PUBLICATIONS

International Search Report for PCT/EP2012/075768, issued on Mar. 20, 2013.

*Primary Examiner* — Peter Bythrow
(74) *Attorney, Agent, or Firm* — Norton Rose Fulbright US LLP; Gerard Messina

(57) ABSTRACT

A radar sensor device for motor vehicles, having a sensor housing, which includes a radome; a fastening section having an engagement contour for a fastening element which is in engagement with the engagement contour and carries a mirror-reflective region; and further fastening sections having engagement contours that are suitable for the engagement of such a fastening element, to fasten the radar sensor device in the installation location in the motor vehicle; and a method for fastening a mirror to a radar sensor device for motor vehicles. Fastening elements of a similar type, which are suitable for the engagement with engagement contours of fastening sections of the radar sensor device, are provided, and at least one of the fastening
(Continued)

elements is provided with a mirror-reflective region, so that a mirror is formed; and the fastening elements are fastened to the fastening sections.

10 Claims, 3 Drawing Sheets

(51) Int. Cl.
    *G01S 13/93*     (2006.01)
    *G01S 7/02*     (2006.01)

(52) U.S. Cl.
    CPC ....... *G01S 13/931* (2013.01); *G01S 2007/027* (2013.01); *G01S 2013/9321* (2013.01); *G01S 2013/9375* (2013.01); *Y10T 29/49947* (2015.01)

(58) Field of Classification Search
    USPC ........................................................ 342/70–72
    See application file for complete search history.

(56) References Cited

U.S. PATENT DOCUMENTS

| | | | | |
|---|---|---|---|---|
| 6,008,750 A * | 12/1999 | Cottle | ................... | G01S 7/032 342/42 |
| 6,363,619 B1 * | 4/2002 | Schirmer | ............... | G01B 11/27 33/288 |
| 6,418,775 B1 * | 7/2002 | Sager | ................... | G01S 7/4026 73/1.79 |
| 6,674,412 B1 * | 1/2004 | Schmidt | ................... | H01Q 1/42 342/70 |
| 6,729,429 B2 * | 5/2004 | Takahashi | ............. | B60R 19/483 180/271 |
| 6,828,931 B2 * | 12/2004 | Kikuchi | ................. | G01S 7/4026 342/174 |
| 6,842,152 B2 * | 1/2005 | Kikuchi | ................. | G01S 7/4026 342/70 |
| 6,933,883 B2 * | 8/2005 | Isaji | ....................... | G01S 7/4026 342/165 |
| 6,937,184 B2 * | 8/2005 | Fujieda | ..................... | G01S 7/03 342/1 |
| 7,212,168 B2 * | 5/2007 | Kozlovski | ............. | H01Q 1/1214 343/713 |
| 7,221,310 B2 * | 5/2007 | Nakagawa | ............ | G01S 7/4026 342/118 |
| 7,499,100 B2 * | 3/2009 | Miyazaki | ................ | B60R 11/04 248/187.1 |
| 8,020,307 B2 * | 9/2011 | Schwindt | ................ | B60R 11/04 33/288 |
| 8,646,823 B2 * | 2/2014 | Mehs | ................... | B60Q 1/0683 296/136.01 |
| 8,665,137 B2 * | 3/2014 | Wintermantel | ......... | G01S 7/032 342/188 |
| 2004/0239574 A1 * | 12/2004 | Zeiher | ................... | B60R 19/483 343/757 |
| 2008/0310040 A1 * | 12/2008 | Suzuki | ................... | B60R 1/072 359/873 |
| 2009/0267822 A1 * | 10/2009 | Shinoda | ................. | G01S 7/352 342/70 |
| 2010/0186244 A1 * | 7/2010 | Schwindt | ................ | B60R 11/04 33/288 |
| 2010/0237655 A1 * | 9/2010 | Mehs | ................... | B60Q 1/0683 296/187.01 |
| 2010/0238068 A1 * | 9/2010 | Seidel | ..................... | G01S 7/032 342/175 |

FOREIGN PATENT DOCUMENTS

| | | |
|---|---|---|
| DE | 102006054325 | 5/2008 |
| DE | 102006056702 | 6/2008 |
| EP | 2113787 | 11/2009 |
| EP | 2233364 | 9/2010 |
| JP | 11326495 | 11/1999 |

* cited by examiner

RADAR SENSOR DEVICE HAVING AN ADJUSTING MIRROR

FIELD OF THE INVENTION

The present invention relates to a radar sensor device for motor vehicles, which has a sensor housing provided with a radome, and fastening devices for fastening the radar sensor in the installation location in the motor vehicle.

BACKGROUND INFORMATION

Radar sensors in motor vehicles are used for measuring the distance and/or speed of objects. Known, for example, are driver assistance systems in the form of cruise controllers for motor vehicles, which use a radar system in order to locate a vehicle driving ahead and to measure the distance to this vehicle. Such a distance control system is also referred to as an ACC system (adaptive cruise control).

To ensure the proper functioning of radar sensors, the sensors must be aligned within predefined limits in relation to the roadway or the desired detection range, for example after their installation in the vehicle. For instance, a radar sensor of an adaptive cruise control system usually requires an alignment of a main radiation direction at a precisely defined elevation angle, also known as elevation, and a precisely defined lateral angle to the longitudinal vehicle axis, for example parallel to the longitudinal vehicle axis. Such an alignment, for example, makes it possible to compensate for production-related tolerances of the mechanical components of the radar sensor, and for tolerances that arise in the fastening to the motor vehicle.

German Patent No. 196 42 811 describes a radar system having transmit/receive elements and a housing, which is sealed by a radar lens in the radiation direction. Two mirror-reflective areas are applied at the front side of the housing, outside the beam path of the electromagnetic waves. They can be produced by vapor deposition of a reflective layer or by bonding a reflective foil, for instance. For the adjustment, laser beams are directed onto the reflective areas, and a directional antenna of the radar system is adjusted in such a way that the reflected laser beams illuminate predefined target markings.

SUMMARY

An object of the present invention is to provide a radar sensor device for motor vehicles, which allows the most precise adjustment possible while keeping the production simple.

This object is achieved by a radar sensor device for motor vehicles, which includes a sensor housing provided with a radome; at least one fastening section, which has an engagement contour for a fastening element, the fastening element being in engagement with the engagement contour and carrying a mirror-reflective area; and at least one further fastening section, which has an engagement contour which is suitable for the engagement of such a fastening element and is used for fastening the radar sensor device in the installation location in the motor vehicle.

Since the mirror-reflective region is disposed on the fastening element, the sensor housing, especially the radome, and the fastening element are able to be produced separately and independently of each other. The fastening element provided with the mirror-reflective area, which may be embodied by a mirror, for example, can then be fixed in place at a selective fastening section. The separate production of this fastening element allows an especially planar design of the reflective surface of the mirror in order to enable a precise reflection in the later use for the adjustment of the radar sensor device. For example, depending on the desired position, this design makes it possible to fasten a mirror, for example, to a correspondingly selected fastening section with the aid of the fastening element. This simplifies the production. Radar sensor devices having differently positioned mirrors, in particular, are able to be produced in an uncomplicated manner, without any need to adapt the sensor housing or the radome for this purpose.

Preferably, the mirror-reflective region is formed by a mirror, which is retained at the individual fastening element. A plate-shaped mirror, such as a coated glass plate, for instance, may be used as mirror. Thus, the mirror is fixed in place on one of the fastening devices.

The radar sensor device preferably has at least three fastening screws for fastening the radar sensor device in the installation location in the motor vehicle; each fastening screw is fastened to the radar sensor device via a separate fastening element that is in engagement with an engagement contour of a particular fastening section. For example, the engagement contours are through openings in the fastening sections, in which the fastening elements engage with sleeves for accommodating fastening screws. The fastening element carrying the reflective region, for example, includes a sleeve of a similar type. Sleeves that are engagement with through openings enable an especially satisfactory alignment of the fastening elements with respect to the fastening sections, and thus the sensor housing.

The fastening element is preferably snapped into place at the engagement contour of the individual fastening section. For example, the individual sleeves may be clipped into place in the through openings.

The fastening element preferably is in form-fitting engagement with the engagement contour. This defines an alignment of the mirror-reflective region with respect to the sensor housing.

The object is furthermore achieved by a method for fastening a mirror to a radar sensor device for motor vehicles, the method comprising the following steps:

Providing a sensor mounting mechanism for a radar sensor device for motor vehicles, which has fastening sections provided with engagement contours for fastening elements of a similar type for fastening the radar sensor device in an installation location in the motor vehicle, and providing fastening elements that are of a similar type and suitable for the engagement with the fastening sections;

Providing at least one of the fastening elements with a mirror-reflective region, so that a mirror is formed; and Fastening the fastening elements to the fastening sections.

The two steps mentioned last can be executed in any temporal sequence. The radar sensor device may be the above-described radar sensor device.

For example, at least the fastening elements that are not provided with the mirror-reflective region may be used to fasten the radar sensor device in the installation location. Optionally, however, it is also possible to use a fastening element provided with the mirror-reflective region to fasten the radar sensor device in the installation location. The fact that fastening elements of a similar type are able to be made available, of which at least one is then provided with the mirror-reflective region, results in an especially efficient production of a radar sensor device that features a selective placement of the reflective region.

DETAILED DESCRIPTION

Figure 1:
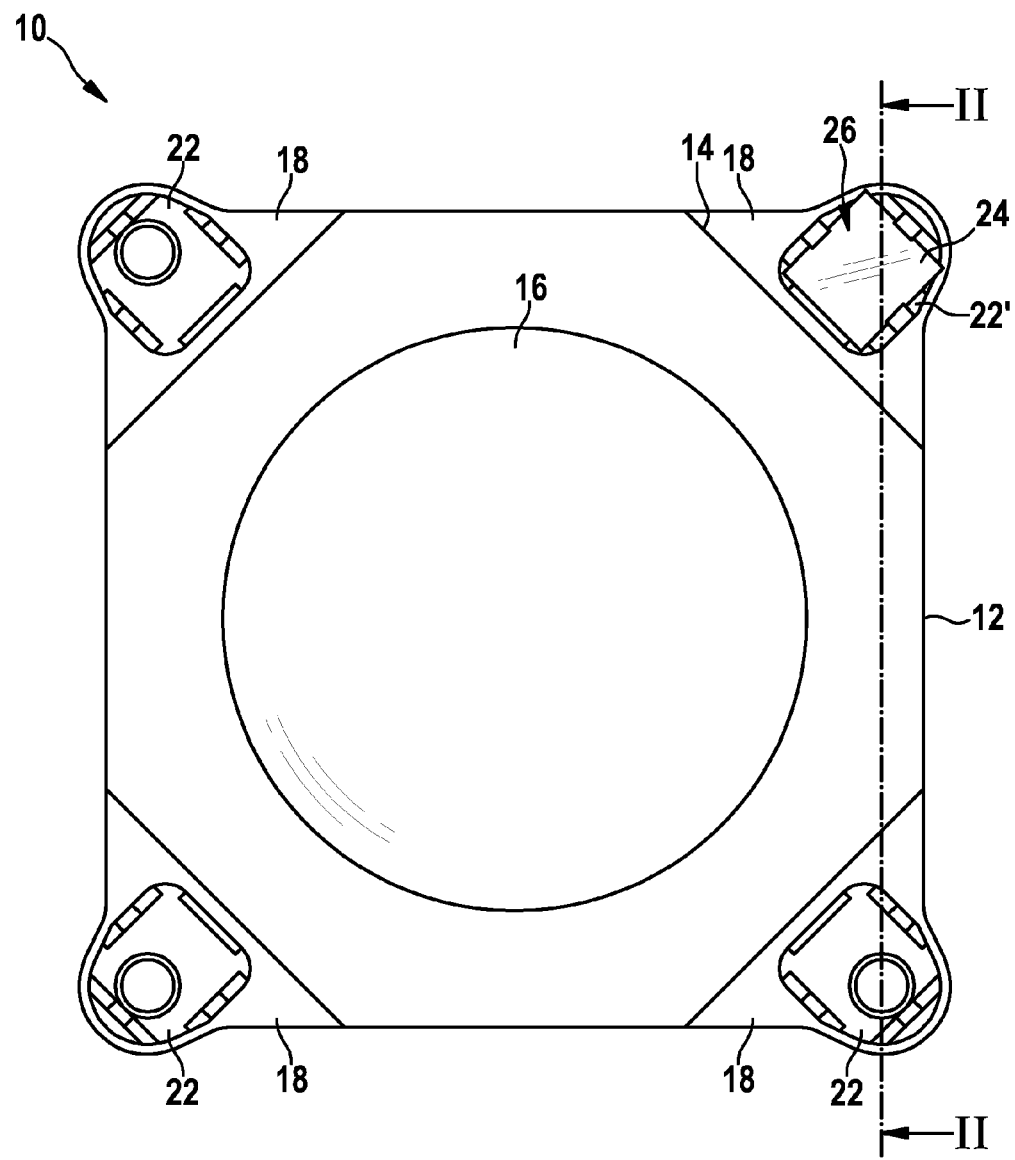
FIG. 1 shows a schematic illustration of a front view of a radar sensor device.

FIG. 1 shows a radar sensor device 10 for motor vehicles, which, for example, includes a transmit and/or receive antenna. For instance, the radar sensor device is a radar sensor device for a driver assistance system of a motor vehicle, especially for a cruise controller. A sensor housing 12 of radar sensor device 10 includes a radome, mounted on a front side, which forms a dielectric radar lens 16. Radome 14 with radar lens 16, for example, is produced from a plastic material of high strength and resistance to atmospheric influences, such as polyetherimide (PEI), so that the radar sensor device may be installed in the front region of a motor vehicle with an exposed radar lens 16.

Sensor housing 12 is essentially rectangular in shape with a square base area; a front section which includes radome 14 has an octagonal outer contour in cross-section, which is formed by corresponding recesses on four edges of the rectangle. On four edges, situated in a square, of sensor housing 12, it forms fastening sections 18 in the form of fastening "ears" provided with engagement contours 20 in the shape of through openings (FIG. 2) for fastening elements 22. Fastening sections 18 lie in one plane. One fastening element 22' carries a mirror 24 including a mirror-reflective region 26 on the front side. Sensor housing 12 and fastening sections 18 form a sensor mounting mechanism for radar sensor device 10. Mirror 24 forms an adjusting mirror for adjusting radar sensor device 10 in an installed state in a motor vehicle.

Figure 2:
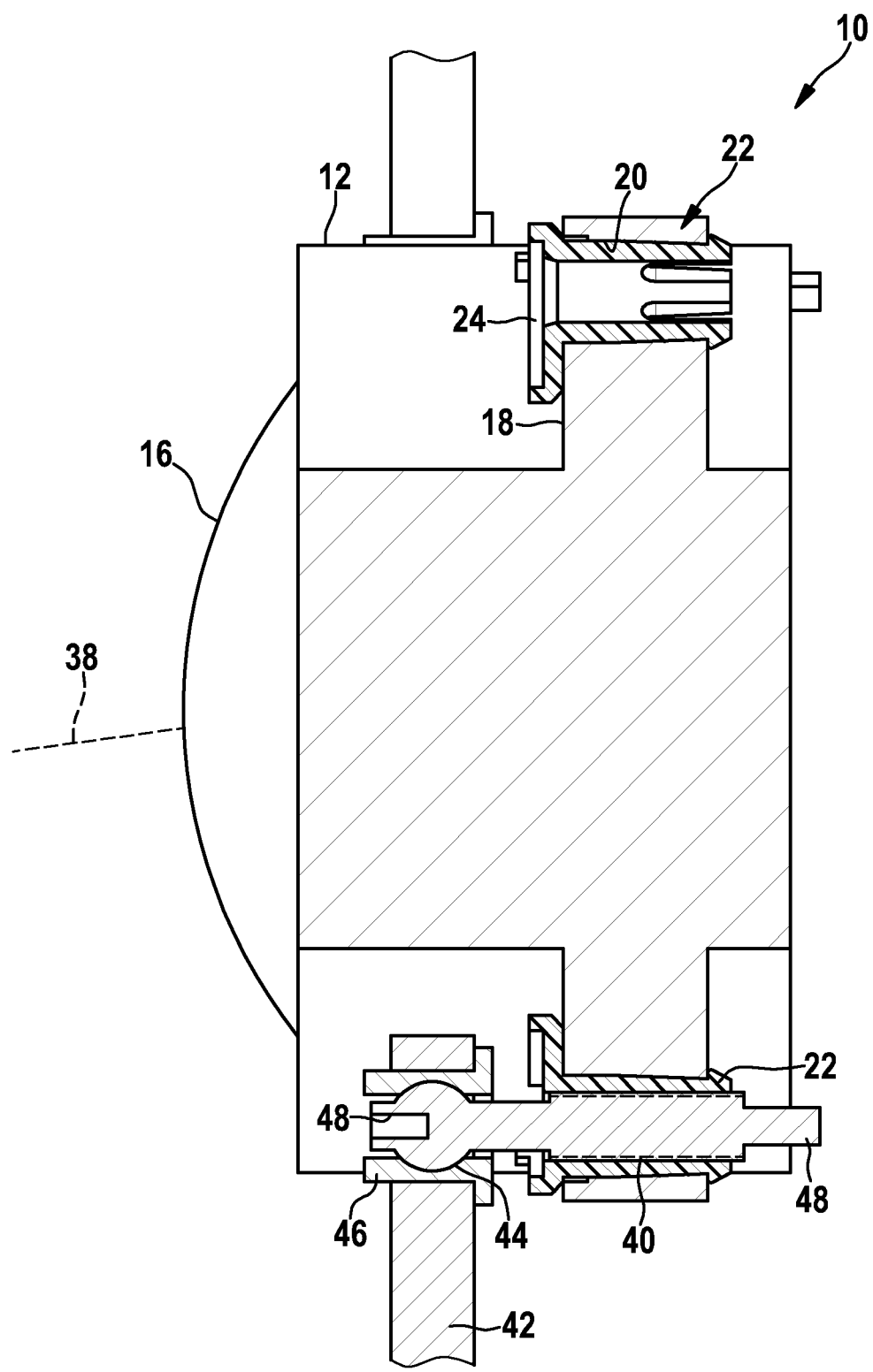
FIG. 2 shows a schematic cross-sectional view of the installed radar sensor device along plane II-II from FIG. 1.
Figure 3:
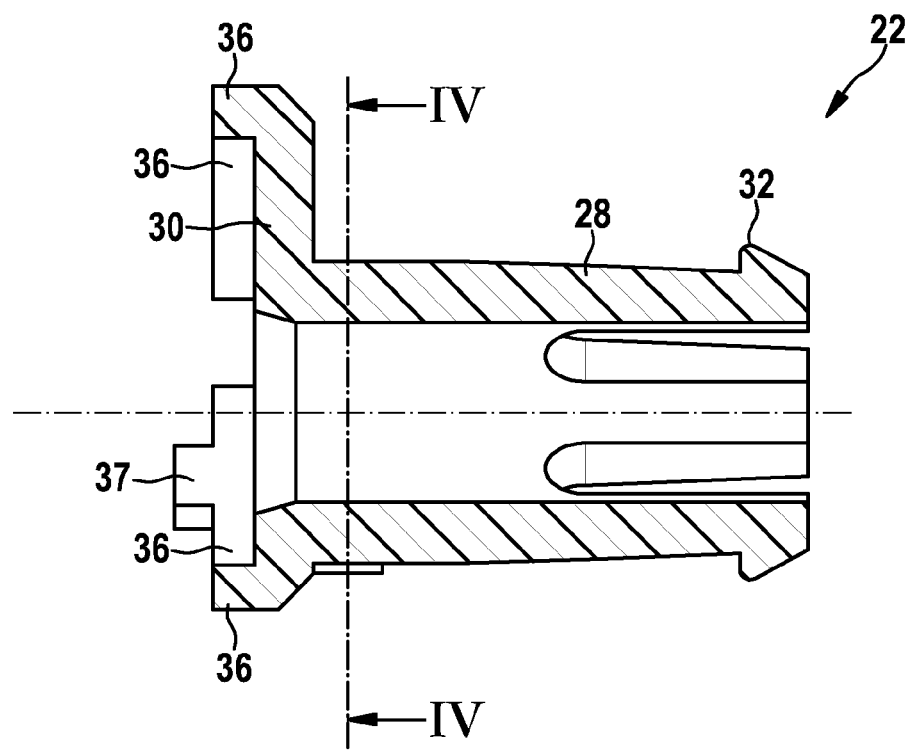
FIG. 3 shows a cross-section through a fastening element of the radar sensor device.

FIG. 2 schematically shows the placement of fastening elements 22, 22' in engagement contours 20, and FIG. 3 shows a detail view of a fastening element 22. The interior of sensor region 12 has been illustrated as shaded block in FIG. 2.

Fastening elements 22, 22' each include a sleeve 28, at whose front end a disk-shaped section 30 projects laterally. Disk-shaped section 30 delimits the insertion depth of sleeve 28 into the through opening of a fastening section 18 and lies against the front side of fastening section 18 in the installed state of fastening element 22. At the opposite end, sleeve 28 has detent projections 32 for locking fastening element 22, 22' into place at engagement contour 20. Fastening element 22, 22' is produced from plastic. Sleeve 28 has slots at the rear end face, which allow a flexible compression of detent projections 32 when sleeve 28 is inserted into engagement contour 20. In the inserted state, fastening element 22, 22' is fixed in place in the longitudinal direction of the through opening, since detent projections 32 and disk-shaped section 30 envelop fastening section 18. Fastening element 22, 22' thus forms a clip, which can latch into place at engagement contour 20.

Figure 4:
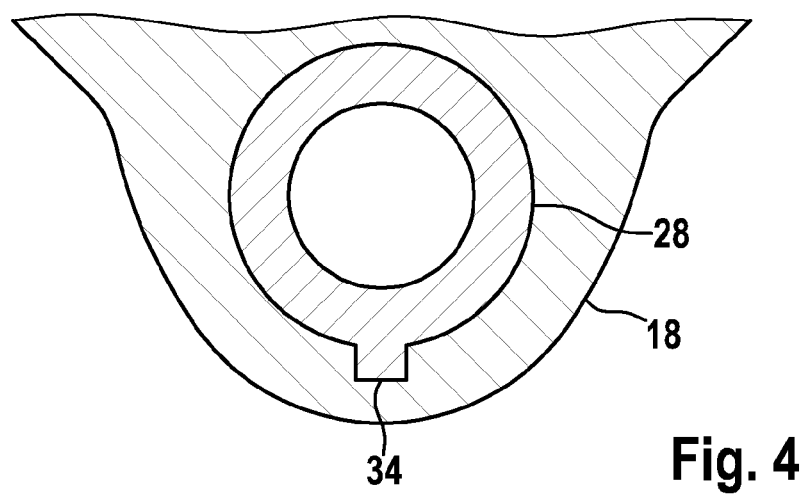
FIG. 4 shows a section through the fastening element, which is in engagement with a fastening section, along plane IV-IV from FIG. 3.

FIG. 4 shows an anti-twist device 34 at the circumference of sleeve 28, which is in engagement with correspondingly formed engagement contour 20 in order to secure fastening element 22 against twisting in the through opening.

As can be gathered from FIG. 2 and FIG. 3, disk-shaped section 30 of fastening element 22' forms a contact surface for mirror 24. The contact surface is delimited by holding elements 36 at the side. Holding elements 36 hold mirror 24 on fastening element 22'. For example, mirror 24 is able to be fixed in place at fastening element 22' in that, once the mirror has been inserted into the receptacle formed by holding elements 36 and disk-shaped section 30, lugs 37 of holding elements 36 that project from at least three sides of mirror 24 are hot-stamped and overlap mirror 24. This is schematically sketched in FIG. 1. FIG. 3 shows a projecting lug 37 at one of holdings elements 36.

Fastening element 22' provided with mirror 24 differs from the other fastening elements 22 only by installed mirror 24 and possibly related deformations of holding elements 36.

Because of the engagement of fastening element 22' in engagement contour 20 and because of the contact surface for mirror 24, the orientation of reflective area 26 with respect to the plane of fastening section 18 has been defined. The outer side of sleeve 28 and the rear side of disk-shaped section 30, and correspondingly, the wall of the through opening which forms engagement contour 20, as well as the upper side of fastening section 18 form contact surfaces for aligning fastening element 22' at fastening section 18.

Depending on the customer specifications or the design requirements, one of engagement contours 20 is selectable for fastening element 22' provided with mirror 24 during the installation. FIG. 2, for example, shows a sectional view along a vertical plane, in which main radiation direction 38 of radar sensor device 10 has an angle that points downward in relation to the horizontal line. When viewed from the front, mirror 24 is disposed on the upper right corner of sensor housing 12 in this case.

The fastening of radar sensor device 10 in the installation location in the motor vehicle takes place with the aid of fastening elements 22. Fastening screws 40, which, for instance, have an outer thread that cuts a thread into sleeve 28, are screwed into sleeves 28 for this purpose. Fastening screws 40 are used to install radar sensor device 10 at holding mechanisms 42 in the motor vehicle. For example, each fastening screws 40 has a spherical head 44, which engages with a recess formed by a plastic element 46, and which is retained on holding mechanism 42 with the aid of plastic element 46. Fastening screws 40, for instance, may have engagement contours 48 on at least one end, for transmitting torque, e.g., an inner and/or an outer hexagonal section. By way of example, only two of fastening screws 40 are provided with engagement contours 48 and form an adjustment screw for aligning radar sensor device 10, while a third fastening screw 40 has no engagement contours 48 and forms a fixed bearing bolt. With the aid of three fastening screws 40 placed in a triangular pattern it is possible to adjust radar sensor device 10 in two directions.

The same radome 14 may be used without modification for any desired position of mirror 24 during the production of radar sensor device 10, and only identically formed fastening elements 22 are required, one of which is modified by the mounting of mirror 24 in each case. For esthetic design reasons, for example, different mirror positions may be desired for radar sensor devices that are to be installed to the left and right in the vehicle. Fastening element 22 serves a dual function. For one, it is used to fasten sensor device 10 by means of fastening screws 40. For another, it forms the contact surface and a holding mechanism for mirror 24. The tool costs for producing the radar sensor device are therefore able to be reduced considerably in comparison with a radar sensor device in which different radomes are required depending on the location in which the reflective region is to be situated.

During the production of radar sensor device 10, the alignment of the radar axis or the main radiation direction 38 as well as the alignment of reflective region 26, for example, are measured in the factory once mirror 24 has been mounted, and stored in an electronics system of the radar sensor device, for instance. For example, the alignments of the radar axis and reflective region 26 (i.e., its surface normal) with respect to a reference plane, e.g., the plane defined by fastening sections 18, are able to be measured. Once the radar sensor device has been fixed in place in the installation location in the motor vehicle, an alignment of the radar axis may take place, in that the alignment of reflective region 26 is adjusted in the known manner, while taking the deviations, stored in the radar sensor device, between the alignments of the radar axis and reflective region 26 into account.

In the described example, reflective region 26 is formed by a mirror 24, e.g., a glass mirror having a silver-coated glass plate. In a deviation, however, reflective region 26 may also be formed by some other mirror. Reflective region 26, for instance, can also be formed directly on fastening element 22'.

While the mounting of a mirror 24 in the above example has been described by way of hot-stamping mirror 24 with fastening element 22', other fastening methods are conceivable as well. For example, mirror 24 may be clipped into place in a receptacle formed by the fastening element, or the mirror may be inserted laterally into a receptacle formed by the fastening element, or the mirror may be bonded to the fastening element.

What is claimed is:

1. A radar sensor device for motor vehicles, comprising:
    a sensor housing that includes a radome;
        at least one first fastening section having a first engagement contour for a fastening element, the fastening element being in engagement with the first engagement contour and carrying a mirror-reflective region disposed on the fastening element; and
        at least one further fastening section having a further engagement contour that is suitable for an engagement of the fastening element and that is for fastening the radar sensor device in an installation location in the motor vehicle.

2. The radar sensor device as recited in claim 1, wherein the mirror-reflective region is formed by a mirror that is retained at the fastening element.

3. The radar sensor device as recited in claim 1, further comprising:
    at least one fastening screw for fastening the radar sensor device in the installation location in the motor vehicle, wherein the fastening screw is fastened to the radar sensor device via a second fastening element that is in engagement with one of the first engagement contour of the first fastening section and the further engagement contour of the further fastening section.

4. The radar sensor device as recited in claim 1, wherein the first and further engagement contours have through openings in the first and further fastening sections, and a sleeve of the fastening element engages with a through opening of at least one of the first and further engagement contours in order to accommodate a fastening screw.

5. The radar sensor device as recited in claim 1, wherein at least one further fastening section includes a fastening element, which is in engagement with the respective engagement contour, for fastening the radar sensor device in the installation location in the motor vehicle, and this fastening element and the fastening element carrying the mirror-reflective region each has a disk-shaped section, which forms a contact surface for a mirror, and a sleeve, extending transversely thereto, for the engagement with the engagement.

6. The radar sensor device as recited in claim 1, wherein the fastening sections are distributed around a circumference of the sensor housing.

7. The radar sensor device as recited in claim 1, wherein the mirror-reflective region is disposed at a distance from the radome.

8. The radar sensor device as recited in claim 1, wherein the fastening element carrying the mirror-reflective region is mounted on the engagement contour in a form-fitting manner.

9. The radar sensor device as recited in claim 1, wherein the engagement contours and the fastening element carrying the mirror-reflective region each have contact surfaces for aligning the fastening element at the particular fastening section.

10. A method for fastening a mirror to a radar sensor device for a motor vehicle, comprising:
    providing a sensor holding mechanism for a radar sensor device for the motor vehicle, the sensor holding mechanism having fastening sections, which have engagement contours for fastening elements of a similar type to fasten the radar sensor device in an installation location in the motor vehicle, and providing fastening elements of a similar type, which are suitable for the engagement with the engagement contours of the fastening sections;
    providing at least one of the fastening elements with a mirror-reflective region disposed on the at least one of the fastening elements, so that a mirror is formed; and
    fastening the fastening elements to the fastening sections.

* * * * *